(12) United States Patent
Li et al.

(10) Patent No.: US 12,441,633 B1
(45) Date of Patent: Oct. 14, 2025

(54) TARGETED IN-SITU ECOLOGICAL REMEDIATION APPARATUS

(71) Applicants: Suzhou University of Science and Technology, Suzhou (CN); China Water Resources and Environment Research Institute (Suzhou) Co., Ltd, Kunshan (CN)

(72) Inventors: Cuimei Li, Suzhou (CN); Shaoguang Zhang, Kunshan (CN); Hao Wang, Kunshan (CN)

(73) Assignees: Suzhou University of Science and Technology, Suzhou (CN); China Water Resources and Environment Research Institute (Suzhou) Co., Ltd, Kunshan (CN)

( * ) Notice: Subject to any disclaimer, the term of this patent is extended or adjusted under 35 U.S.C. 154(b) by 0 days.

(21) Appl. No.: 19/176,166

(22) Filed: Apr. 11, 2025

(30) Foreign Application Priority Data

Aug. 30, 2024 (CN) .......................... 202411207891.8

(51) Int. Cl.
*C02F 1/28* (2023.01)
*C02F 3/30* (2023.01)
*C02F 3/32* (2023.01)
*C02F 101/10* (2006.01)
*C02F 101/16* (2006.01)
*C02F 103/00* (2006.01)

(52) U.S. Cl.
CPC .............. *C02F 1/281* (2013.01); *C02F 3/303* (2013.01); *C02F 3/32* (2013.01); *C02F 2101/105* (2013.01); *C02F 2101/16* (2013.01); *C02F 2103/007* (2013.01)

(58) Field of Classification Search
CPC .... C02F 1/281; C02F 3/303; C02F 2101/105; C02F 2101/16; C02F 2103/007
USPC .................................. 210/660, 602, 615, 903
See application file for complete search history.

(56) References Cited

FOREIGN PATENT DOCUMENTS

| CN | 107487835 A | | 12/2017 | |
|---|---|---|---|---|
| CN | 112794560 A | | 5/2021 | |
| CN | 113003885 A | * | 6/2021 | .............. C02F 1/281 |
| CN | 114349281 A | * | 4/2022 | |
| CN | 115286120 A | * | 11/2022 | ................ C02F 1/46 |
| KR | 20180015459 A | * | 2/2018 | .............. B01D 33/06 |

OTHER PUBLICATIONS

Machine-generated English translation of CN 113003885, generated on Aug. 26, 2025.*

(Continued)

*Primary Examiner* — Fred Prince

(57) ABSTRACT

Provided is a targeted in-situ ecological remediation apparatus, includes a frame, a float plate, an ecological adsorption device, and a planting assembly. The ecological adsorption device includes multiple ecological adsorption ball assemblies. The multiple ecological adsorption ball assemblies are prepared from a modified silicoaluminate inorganic mesoporous material and are configured to adsorb pollutants within a to-be-treated river. The frame is configured to secure the ecological adsorption device at a drainage outlet of the to-be-treated river, to specifically treat sewage at the drainage outlet, thereby intercepting pollutants entering the to-be-treated river.

6 Claims, 4 Drawing Sheets

(56) References Cited

OTHER PUBLICATIONS

Machine-generated English translation of CN 20180015459, generated on Aug. 26, 2025.*
Machine-generated English translation of CN 115286120, generated on Aug. 26, 2025.*
Machine-generated English translation of CN 114349281, generated on Aug. 26, 2025.*

* cited by examiner

TARGETED IN-SITU ECOLOGICAL REMEDIATION APPARATUS

CROSS-REFERENCE TO RELATED APPLICATION

This application claims priority to Chinese patent application No. CN 202411207891.8, filed to China National Intellectual Property Administration (CNIPA) on Aug. 30, 2024, which is herein incorporated by reference in its entirety.

TECHNICAL FIELD

The present disclosure relates to the field of wastewater remediation technologies, and particularly to a targeted in-situ ecological remediation apparatus based on a modified silicoaluminate inorganic mesoporous material.

BACKGROUND

Various types of wastewaters entering rivers and initial rainwater entering rivers are primary causes leading to water quality deterioration of the rivers. These pollutants enter water bodies directly through outlets within the rivers, causing significant impacts on water quality, urban ecological environments, and residents' living standards. Consequently, exploring effective river water quality remediation technologies has become an urgent need in the field of environmental protection.

In terms of river water quality remediation, source control and pollution interception and in-situ river remediation are two main strategies. The source control and pollution interception strategy reduces pollution loads of rivers by controlling the entry of pollutants at a source. Specifically, the source control and pollution interception strategy includes: constructing interception wells that divert sewage to wastewater treatment plants before the sewage enter rivers, thereby effectively blocking pollution sources. However, relying solely on the source control and pollution interception is insufficient to completely address existing pollution issues within the rivers, especially short-term high-concentration pollution caused by sediment pollution and initial rainwater runoff. In this context, in-situ river treatment technologies have emerged, in which ecological floating islands, as a green and ecological remediation method, have garnered widespread attention. The ecological floating islands effectively remove pollutants from a water body through the combined action of multiple pathways by setting up plant purification units and biological purification units on a water surface, and utilizing multiple pathways such as plant absorption, substrate adsorption, and microbial degradation. This technology not only improves water quality but also improves the ecological environment of the water body and enhances its self-purification capacity.

Although current ecological floating island technologies show some potential in river water quality remediation, their purification mechanism mainly relies on biochemical actions of microorganisms, thereby resulting in longer purification cycles and relatively lower efficiency, making it difficult to significantly improve water quality in a shorter term. Additionally, microorganisms are remediation sensitive to changes in environmental factors, sudden changes in the physicochemical properties of the water body or the pollution load can adversely affect microbial communities within the biological purification units, thereby impacting the stability of the purification effect. Furthermore, setting up the biological purification units directly within the rivers might be constrained by environmental factors such as inadequate dissolved oxygen in the water body, therefore, additional aeration systems are required to maintain microbial activity, which undoubtedly increases complexity of a corresponding device and limits application scenarios of the corresponding device. Finally, even though aquatic plants can remove some pollutants from the water body through adsorption, regular maintenance and harvesting are indispensable owing to death of the aquatic plants leading to the re-release of absorbed pollutants back into the water body, creating new internal pollution sources, and posing a challenge of higher maintenance costs for using the aquatic plants to purify the water body.

Therefore, innovations and optimizations are urgently needed to address the aforementioned deficiencies in existing ecological floating island technologies.

SUMMARY

The present disclosure aims to address the shortcomings of unstable purification efficiency and higher maintenance costs of existing ecological floating island technologies through technological innovation, in order to meet requirements of different river remediation requirements.

To achieve the aforementioned objectives, the technical solutions adopted by the present disclosure are as follows.

A targeted in-situ ecological remediation apparatus is provided, which includes: an ecological adsorption device, a frame, a float plate, and a planting assembly. The ecological adsorption device is configured to be arranged in a to-be-treated river and includes multiple ecological adsorption ball assemblies, and the multiple ecological adsorption ball assemblies are prepared from a modified silicoaluminate inorganic mesoporous material and are configured to adsorb pollutants within the to-be-treated river. The frame defines an accommodation cavity. The frame includes a support assembly, a side plate assembly, and a bottom plate. The accommodation cavity is configured to accommodate the ecological adsorption device. The multiple ecological adsorption ball assemblies are arranged in the accommodation cavity according to a predefined row and column combination. The bottom plate is a 100-mesh stainless steel screen. The float plate is disposed on the ecological adsorption device and is arranged in accommodation cavity. Multiple planting holes is arranged on the float plate. The planting assembly includes custom pots and aquatic plants placed within the custom pots, the custom pots are disposed in the multiple planting holes, and a bottom of each of the custom pots is provided with a drainage hole.

In an embodiment, a pore size of an internal channel of the modified silicoaluminate inorganic mesoporous material is in a range of 2 nm to 50 nm, and a specific surface area of the modified silicoaluminate inorganic mesoporous material is in a range of 30 m$^2$/g to 40 m$^2$/g.

In an embodiment, each of the multiple ecological adsorption ball assemblies includes a descending ball and multiple floating balls, and the descending ball and the multiple floating balls are sequentially and vertically connected in that order from a bottom of the accommodation cavity to a top of the accommodation cavity.

In an embodiment, each of the multiple floating balls includes a spherical shell. The spherical shell of each of the multiple floating balls includes an outer shell and an inner shell adjacent to the outer shell. The outer shell of the spherical shell of each of the multiple floating balls is in a grid pattern with a mesh size of 1 cm×2 cm. The inner shell of the spherical shell of each of the multiple floating balls is made of a nylon bag with a mesh size of 80 mesh. The spherical shell of each of the multiple floating balls defines a hollow spherical cavity. A layer of the modified silicoaluminate inorganic mesoporous material and a pearl cotton layer are sequentially filled in the hollow spherical cavity of the spherical shell of each of the multiple floating balls from a bottom of the hollow spherical cavity of the spherical shell of each of the multiple floating balls to a top of the hollow spherical cavity of the spherical shell of each of the multiple floating balls. Multiple slow-release nitrifying bacteria solid balls are filled in the pearl cotton layer. The layer of the modified silicoaluminate inorganic mesoporous material in the hollow spherical cavity of the spherical shell of each of the multiple floating balls consists of a layer of modified silicoaluminate mesoporous material with a particle size of 2 cm to 4 cm, a layer of modified silicoaluminate mesoporous material with a particle size of 1 cm to 2 cm, and a layer of modified silicoaluminate mesoporous material with a particle size of 1 mm to 4 mm from the bottom of the hollow spherical cavity of the spherical shell of each of the multiple floating balls to the top of the hollow spherical cavity of the spherical shell of each of the multiple floating balls. The layer of modified silicoaluminate mesoporous material with the particle size of 2 cm to 4 cm, the layer of modified silicoaluminate mesoporous material with the particle size of 1 cm to 2 cm, and the layer of modified silicoaluminate mesoporous material with the particle size of 1 mm to 4 mm in each of the multiple floating balls are all made from the modified silicoaluminate mesoporous material with the specific surface area of 30 $m^2/g$ to 40 $m^2/g$.

In an embodiment, a weight ratio of the layer of the modified silicoaluminate inorganic mesoporous material to the pearl cotton layer in the hollow spherical cavity of the spherical shell of each of the multiple floating balls is in a range of 50:1 to 70:1, and a weight ratio of the pearl cotton layer to the multiple slow-release nitrifying bacteria solid balls filled in the pearl cotton layer is in a range of 0.5 to 1.

In an embodiment, a weight of the layer of the modified silicoaluminate inorganic mesoporous material in the hollow spherical cavity of the spherical shell of each of the multiple floating balls is 1.5 kg, a weight of the pearl cotton layer is 25 g, and a total weight of the multiple slow-release nitrifying bacteria solid balls filled in the pearl cotton layer is 40 g.

In an embodiment, the descending ball includes a spherical shell. The spherical shell of the descending ball includes an outer shell and an inner shell adjacent to the outer shell. The outer shell of the spherical shell of the descending ball is in a grid pattern with a mesh size of 1 cm×2 cm. The inner shell of the spherical shell of the descending ball is made of a nylon bag with a mesh size of 80 mesh. The spherical shell of the descending ball defines a hollow spherical cavity. A layer of the modified silicoaluminate inorganic mesoporous material and multiple slow-release nitrifying bacteria solid balls are sequentially filled in the hollow spherical cavity of the spherical shell of the descending ball from a bottom of the hollow spherical cavity of the spherical shell of the descending ball to a top of the hollow spherical cavity of the spherical shell of the descending ball. The layer of the modified silicoaluminate inorganic mesoporous material in the hollow spherical cavity of the spherical shell of the descending ball consists of a layer of modified silicoaluminate mesoporous material with a particle size of 2 cm to 4 cm, a layer of modified silicoaluminate mesoporous material with a particle size of 1 cm to 2 cm, and a layer of modified silicoaluminate mesoporous material with a particle size of 1 mm to 4 mm from the bottom of the hollow spherical cavity of the spherical shell of the descending ball to the top of the hollow spherical cavity of the spherical shell of the descending ball. The layer of modified silicoaluminate mesoporous material with the particle size of 2 cm to 4 cm, the layer of modified silicoaluminate mesoporous material with the particle size of 1 cm to 2 cm, and the layer of modified silicoaluminate mesoporous material with the particle size of 1 mm to 4 mm in the descending ball are all made from the modified silicoaluminate mesoporous material with the specific surface area of 30 $m^2/g$ to 40 $m^2/g$.

In an embodiment, in the hollow spherical cavity of the spherical shell of the descending ball, a weight ratio of the layer of the modified silicoaluminate inorganic mesoporous material to the multiple slow-release nitrifying bacteria solid balls is in a range of 0.02 to 0.03.

In an embodiment, at least one side of the frame is a horizontal plane, the support assembly includes multiple vertical support rods and multiple horizontal support rods. The vertical support rods on the horizontal plane extend upward to form mounting components, and the mounting components are configured for fixing the frame to a revetment. In another embodiment, the mounting components are equipped with threaded holes, allowing the frame to be securely fastened to the revetment using expansion bolts, which minimizes installation workload of the targeted in-situ ecological remediation apparatus. The structural design of the frame can be customized according to the specific conditions of a discharge outlet of the to-be-treated river, to adjust a length, a width, and a height of the frame based on actual spatial conditions of a pollution treatment site. This flexibility ensures that the targeted in-situ ecological remediation apparatus is not restricted by spatial or terrain limitations, enabling direct installation at a position of a river pollution source, significantly enhancing purification efficiency. The targeted in-situ ecological remediation apparatus can be flexibly arranged according to spatial conditions of the pollution treatment site, conforming to an original spatial structure of an installation location, thereby harmonizing with the overall landscape and offering a wider range of application scenarios.

In an embodiment, a shape of the frame may be but is not limited to one of a cube, cuboid, or semi-cylinder, and may be designed according to actual conditions of a discharge outlet of the to-be-treated river.

To achieve the aforementioned objectives, the present disclosure further provides a preparation method for a modified silicoaluminate inorganic mesoporous material. The prepared modified silicoaluminate inorganic mesoporous material is applied to the aforementioned targeted in-situ ecological remediation apparatus, and the preparation method includes the following steps:

S1, crushing silicoaluminate and screening out silicoaluminate particles of a particle size corresponding to a range of 80 mesh to 100 mesh;

S2, soaking the silicoaluminate particles obtained in the S1 in nitrate solution with a concentration of 1 mol/L to 6 mol/L for 12 hours to 24 hours to make every 1 gram (g) of the silicoaluminate particles correspond to 10 mL to 60 mL of the nitrate solution, then filtering, drying at a temperature of 95° C. to 110° C. after the filtering, followed by calcining at a temperature of 400° C. to 500° C. for 1 hour to 2 hours to thereby obtain primary modified silicoaluminate particles; and S3, soaking the primary modified silicoaluminate particles obtained in the S2 in chitosan solution with a mass concentration of 3% to 5% and a temperature of 40° C. to 60° C. for 0.5 hours to 3 hours, then filtering and washing with water, followed by drying at a temperature of 95° C. to 110° C. to thereby obtain the modified silicoaluminate inorganic mesoporous material.

In an embodiment, a specific surface area of the silicoaluminate is 14 m$^2$/g to 16 m$^2$/g.

In an embodiment, the silicoaluminate is at least one selected from the group consisting of sodium silicoaluminate, potassium silicoaluminate, and calcium silicoaluminate.

In an embodiment, in the S2, nitrate in the nitrate solution is sodium nitrate or potassium nitrate.

In an embodiment, in the S2, the concentration of the nitrate solution is 4 mol/L, every 1 g of the silicoaluminate particles correspond to 10 mL of the nitrate solution, and a duration for the soaking is 12 hours;

In an embodiment, in the S2, the temperature for the calcining is 400° C., and the duration for the calcinating is 1 hour.

In an embodiment, in the S3, the chitosan solution is an alkaline chitosan solution with a pH value of 9.5 to 10.5.

In an embodiment, in the S3, the mass concentration of the chitosan solution is 5%, the temperature of the chitosan solution is 50° C., and a duration for the soaking in the chitosan solution is 1 hour.

To achieve the aforementioned objectives, the present disclosure provides a modified silicoaluminate inorganic mesoporous material prepared by the aforementioned preparation method.

In an embodiment, a specific surface area of the modified silicoaluminate inorganic mesoporous material is in a range of 30 m$^2$/g to 40 m$^2$/g.

Beneficial effects of the present disclosure lie in providing the preparation method for the modified silicoaluminate inorganic mesoporous material. Through calcination modification of the nitrate and modification of the alkaline chitosan, and by controlling parameters such as the particle size and specific surface area of silicoaluminate, the concentration of the nitrate solution, a solid-liquid ratio of the silicoaluminate particles to the nitrate solution, the duration for the calcinating, the temperature for the calcinating, the pH value of the chitosan solution, the mass fraction, and temperature, it is possible to stably produce the modified silicoaluminate inorganic mesoporous material with a specific surface area consistently within 30 m$^2$/g to 40 m$^2$/g. Moreover, the pore size of the internal channel of the modified silicoaluminate inorganic mesoporous material can reach a sub-nanometer level.

The present disclosure designs the targeted in-situ ecological remediation apparatus based on the modified silicoaluminate inorganic mesoporous material, and the targeted in-situ ecological remediation apparatus includes a frame, an ecological adsorption device, a float plate, and a planting assembly. The frame includes a support assembly, a side plate assembly, and a bottom plate. The support assembly includes multiple vertical support rods and multiple horizontal support rods. The multiple vertical support rods and the multiple horizontal support rods are laser-welded together. The multiple vertical support rods and multiple horizontal support rods are combined with side plate assembly and the bottom plate to form an accommodation cavity. The accommodation cavity can accommodate the ecological adsorption device containing floating ball the multiple ecological adsorption ball assemblies arranged in preset rows and columns. A float plate is disposed on the ecological adsorption device and is configured for planting aquatic plants thereon.

Pollution caused by various types of wastewaters entering rivers and initial rainwater entering rivers is a primary route for pollutants entering river water bodies. The designed targeted in-situ remediation apparatus facilitates directional installation of the ecological adsorption device at a discharge outlet of the to-be-treated river. The ecological adsorption device of the present disclosure uses the layer of the modified silicoaluminate inorganic mesoporous material, the pearl cotton layer, and the multiple slow-release nitrifying bacteria solid balls to prepare floating balls. These floating balls have a longer purification duration, are easy to clean, specifically, the floating balls are simply washed in saline or clean water after use. In addition, the floating balls can be reused, thereby avoiding environmental pollution, and saving costs.

Further, in the present disclosure, the float plate and the planting assembly are disposed on the ecological adsorption device. As such, on one hand, green plants absorb carbon dioxide and emit oxygen through photosynthesis, making pollution treatment ecological; and on the other hand, potted green plants provide good landscape effects and can be replaced throughout the year, which prevents aquatic plants from becoming secondary pollution sources or endogenous pollution in the water body.

REFERENCE NUMERALS

1. Ecological adsorption device; 2. Frame; 3. Planting assembly; 4. Floating ball; 5. Float plate; 21. Support assembly; 22. Bottom plate; 23. Mounting component; 24. Side plate assembly; 41. Outer shell; 42. Inner shell; 43. Layer of modified silicoaluminate inorganic mesoporous material; 44. Pearl cotton layer; 45. Slow-release nitrifying bacteria solid ball; 51. Planting hole.

DETAILED DESCRIPTION OF EMBODIMENTS

Technical solutions of the present disclosure will be clearly and completely described in conjunction with embodiments of this application hereinafter. It is apparent that the described embodiments are merely a part of embodiments of the present disclosure, not all of them. Based on the described embodiments in the present disclosure, all other embodiments obtained by ordinary technicians in the field without creative labor fall within the scope of protection of the present disclosure.

To make the objectives, features, and advantages of the present disclosure more clearly and easier to understand, the specific embodiments of the present disclosure are further described in detail below.

Embodiment 1

Figure 1:
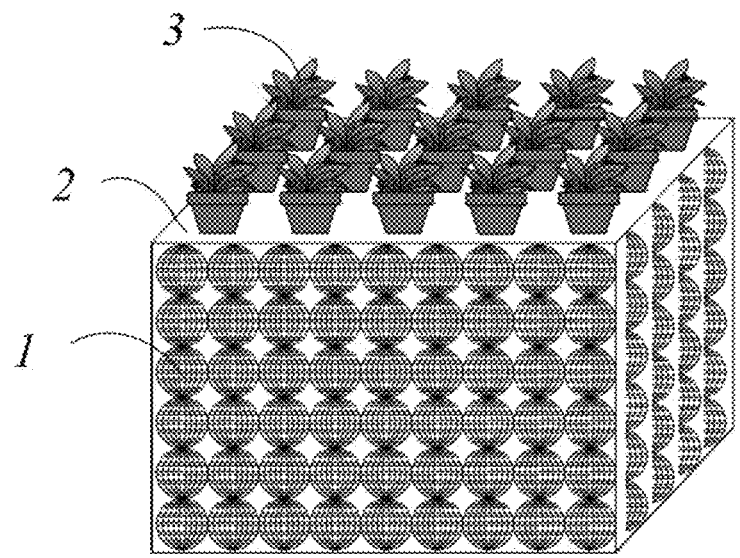
FIG. 1 illustrates a schematic structural diagram of a targeted in-situ ecological remediation apparatus according to an embodiment 1 of the present disclosure.
Figure 2:
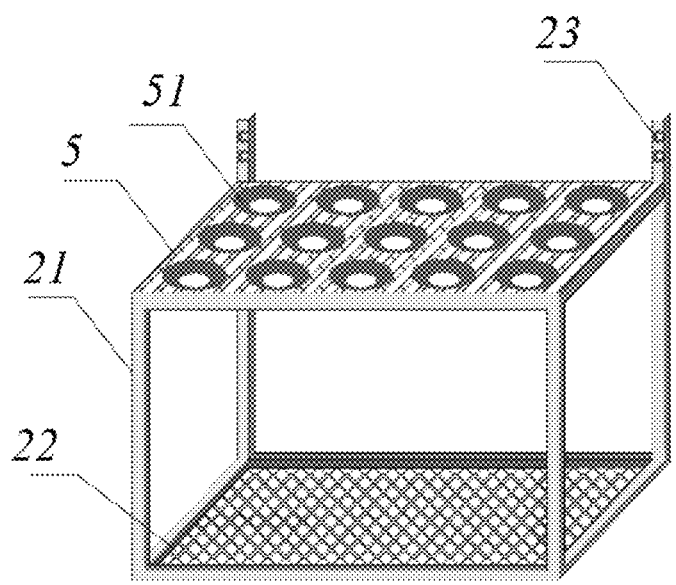
FIG. 2 illustrates a schematic structural diagram of a frame of the targeted in-situ ecological remediation apparatus according to the embodiment 1 of the present disclosure.
Figure 3:
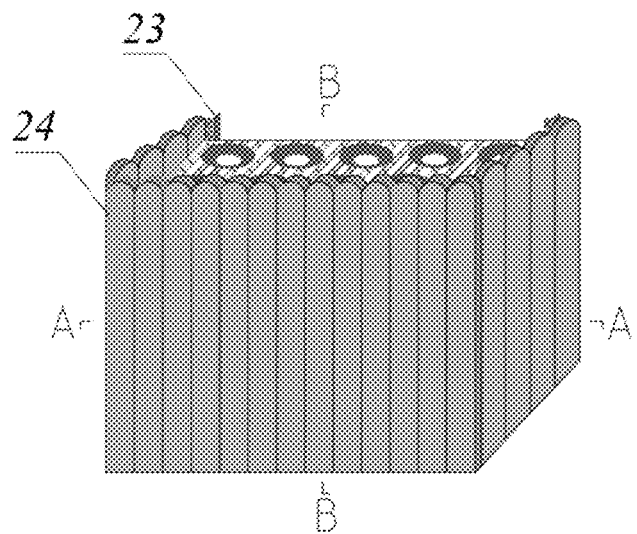
FIG. 3 illustrates a schematic structural diagram of a frame with a side plate assembly of the targeted in-situ ecological remediation apparatus according to the embodiment 1 of the present disclosure.

The embodiment 1 provides a targeted in-situ ecological remediation apparatus, as shown in FIG. 1 to FIG. 3, and targeted in-situ ecological remediation apparatus includes an ecological adsorption device 1, a frame 2, a float plate 5, and a planting assembly 3 disposed on the float plate 5.

Specifically, the ecological adsorption device 1 is configured to be arranged in a to-be-treated river and includes multiple ecological adsorption ball assemblies, and the multiple ecological adsorption ball assemblies are prepared from a modified silicoaluminate inorganic mesoporous material and are configured to adsorb pollutants within the to-be-treated river. A pore size of the modified silicoaluminate inorganic mesoporous material is in a range of 1 nm to 2 nm, a specific surface area of the modified silicoaluminate inorganic mesoporous material is 1000 $m^2/g$, and a molecular weight of the modified silicoaluminate inorganic mesoporous material is 213.

The frame 2 includes a support assembly 21, a side plate assembly 24, and a bottom plate 22, which together define a rectangular accommodation cavity, which is used to accommodate the ecological adsorption device 1. The support assembly 21 includes 4 vertical support rods and 8 horizontal support rods, which are all made of stainless-steel angle steel. 4 horizontal support rods of 8 horizontal support rods are connected end-to-end and laser-welded into a rectangular framework. The other horizontal support rods of 8 horizontal support rods are connected end-to-end and laser-welded into another rectangular framework. The two rectangular frameworks are stacked vertically, with the 4 vertical support rods laser-welded at corners of the two rectangular frameworks, thereby forming a rectangular cuboid framework. A length, a width, and a height of the rectangular cuboid framework are 1.5 m, 0.9 m and 1.0 m, respectively. The bottom plate 22 is disposed on a bottom of the rectangular cuboid framework. The bottom plate 22 is a 100-mesh stainless steel screen and is fixed onto a lower rectangular framework of the two rectangular frameworks.

Adjacent two vertical support rods of the 4 vertical support rods extend upwards to form two mounting components 23 equipped with mounting holes. The mounting components are configured for fixing the frame 2 to a revetment. The side plate assembly 24 are installed on sides of the rectangular cuboid framework, and the side plate assembly 24 consists of multiple elongated side plates. Each of the multiple elongated side plates is an anti-corrosion wooden board. A length, a width, and a thickness of each of the multiple elongated side plates are 1.2 m, 0.2 m, and 5 mm, respectively. An upper end of each of the multiple elongated side plates is arc-shaped. A height of each of the multiple elongated side plates above a water level is equal to a height of each of the mounting components 23. In an embodiment, the height of each of the mounting components 23 is 0.2 m.

Each of the multiple ecological adsorption ball assemblies includes a descending ball and multiple floating balls 4, and the descending ball and the multiple floating balls 4 are sequentially and vertically connected in that order from a bottom of the accommodation cavity to a top of the accommodation cavity. Specifically, a number of the multiple floating balls 4 is 5, and a number of the descending ball is 1. The descending ball is located at the bottom of the accommodation cavity. The floating balls 4 and the descending ball are connected using cable ties to form a chain. The accommodation cavity is arranged with 10 columns of ecological adsorption ball assemblies, each column containing 6 chains, totaling 60 chains.

Figure 5:
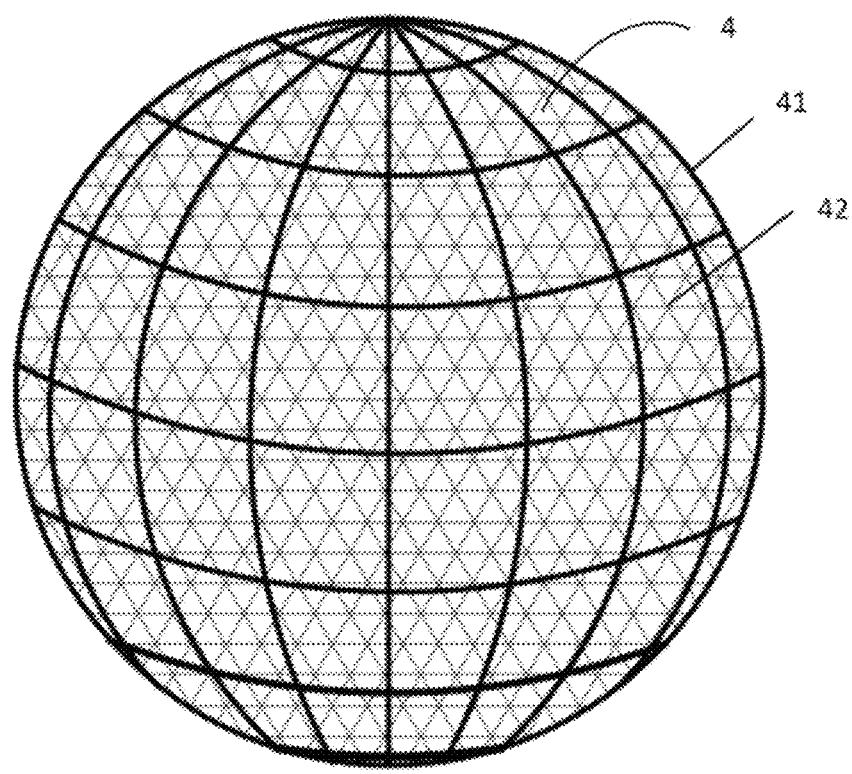
FIG. 5 illustrates a schematic stereoscopic structural diagram of a floating ball according to the embodiment 1 of the present disclosure.
Figure 6:
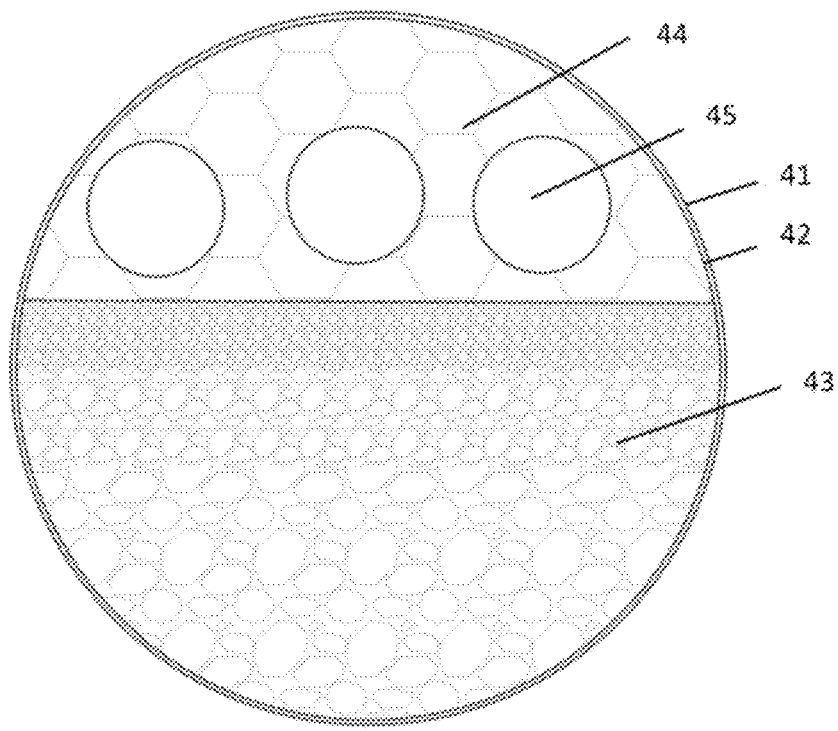
FIG. 6 illustrates a schematic cross-sectional structural diagram of the floating ball according to the embodiment 1 of the present disclosure.

In an embodiment, the floating ball 4 includes a spherical shell. As shown in FIG. 5 and FIG. 6, the spherical shell includes an outer shell 41 and an inner shell 42 adjacent to each other. The outer shell 41 is in a grid pattern with a diameter of 15 cm and is made of polyurethane. A mesh size of the outer shell 41 is 1 cm×2 cm. The inner shell 42 is made of a nylon bag with a mesh size of 80 mesh, designed to prevent the leakage of pearl cotton and slow-release nitrifying bacteria solid balls 45. The spherical shell defines a hollow spherical cavity, which is sequentially filled from bottom to top with a layer of modified silicoaluminate inorganic mesoporous material 43 and a pearl cotton layer 44. Multiple slow-release nitrifying bacteria solid balls 45 are filled in the pearl cotton layer 44. The layer of modified silicoaluminate inorganic mesoporous material 43 is composed of three layers: a layer of modified silicoaluminate mesoporous material with a particle size of 2 cm to 4 cm, a layer of modified silicoaluminate mesoporous material with a particle size of 1 cm to 2 cm, and a layer of modified silicoaluminate mesoporous material with a particle size of 1 mm to 4 mm from the bottom of the hollow spherical cavity to the top of the hollow spherical cavity. All of the three layers are made from the modified silicoaluminate inorganic mesoporous material with a specific surface area of 30 $m^2/g$-40 $m^2/g$, whose preparation method can be referenced from an embodiment 5 through an embodiment 16.

In the floating ball 4, a weight of the layer of modified silicoaluminate inorganic mesoporous material 43 is 1.5 kg. Specifically, a weight of the layer of modified silicoaluminate mesoporous material with the particle size of 2 cm to 4 cm is 600 g, a weight of the layer of modified silicoaluminate mesoporous material with the particle size of 1 cm to 2 cm is 480 g, and a weight of the layer of modified silicoaluminate mesoporous material with the particle size of 1 mm to 4 mm is 420 g. A weight of the multiple slow-release nitrifying bacteria solid balls 45 is 40 g. A quantity of the multiple slow-release nitrifying bacteria solid balls 45 is 3. A weight of the pearl cotton layer 44 is 25 g, and the pearl cotton layer 44 is shaped as a cylinder with a diameter of 2.2 cm and a height of 5 cm.

In an embodiment, the descending ball also includes a spherical shell. The spherical shell includes an outer shell 41 and an inner shell 42 adjacent to each other. The outer shell 41 is in a grid pattern with a mesh size of 1 cm×2 cm and a diameter of 15 cm. The outer shell 41 is made from polyurethane. The inner shell 42 is made of a nylon bag with a mesh size of 80 mesh, designed to prevent the leakage of slow-release nitrifying bacteria solid balls 45. The spherical shell defines a hollow spherical cavity, which is sequentially filled from bottom to top with a layer of modified silicoaluminate inorganic mesoporous material 43 and multiple slow-release nitrifying bacteria solid balls 45. The layer of modified silicoaluminate inorganic mesoporous material 43 is composed of three layers: a layer of modified silicoaluminate mesoporous material with a particle size of 2 cm to 4 cm, a layer of modified silicoaluminate mesoporous material with a particle size of 1 cm to 2 cm, and a layer of modified silicoaluminate mesoporous material with a particle size of 1 mm to 4 mm from the bottom of the hollow spherical cavity to the top of the hollow spherical cavity. The multiple slow-release nitrifying bacteria solid balls 45 are disposed on the layer of modified silicoaluminate mesoporous material with the particle size of 1 mm to 4 mm. All of the three layers are made from the modified silicoaluminate inorganic mesoporous material with a specific surface area of 30 $m^2/g$-40 $m^2/g$, whose preparation method can be referenced from an embodiment 5 through an embodiment 16.

In the descending ball, a weight of the layer of modified silicoaluminate inorganic mesoporous material 43 is 3 kg. Specifically, a weight of the layer of modified silicoaluminate mesoporous material with the particle size of 2 cm to 4 cm is 1.8 kg, a weight of the layer of modified silicoaluminate mesoporous material with the particle size of 1 cm to 2 cm is 0.7 kg, and a weight of the layer of modified silicoaluminate mesoporous material with the particle size of 1 mm to 4 mm is 0.5 kg. A weight of the multiple slow-release nitrifying bacteria solid balls 45 is 65 g, with a quantity of 5.

In an embodiment, the float plate 5 is disposed on a top of the ecological adsorption device 1, four corners of the float plate 5 are secured by clips to the 4 vertical support rods. The float plate 5 can move up and down with rise or fall of a water level. A length, a width, and a thickness of the float plate 5 are 1.5 m, 0.9 m and 5 cm, respectively. Planting holes 51 are evenly distributed in a 3-row and 5-column pattern on the float plate 5. A diameter of each planting hole 51 is approximately 20 cm, and the float plate 5 is a foam board. The planting assembly 3 is disposed on a water surface and is configured to grow aquatic plants thereon. The planting assembly 3 includes custom pots and the aquatic plants placed within the custom pots, and a bottom of each of the custom pots is provided with a drainage hole to facilitate water permeation. The custom pots are filled with planting soil, and upper edges of the custom pots are fixed by being placed onto the planting holes 51. When the water level of the to-be-treated river changes, the entire planting assembly 3 can move up and down with the float plate 5.

Embodiment 2

In the embodiment 2, the frame of the targeted in-situ ecological remediation apparatus of the embodiment 1 is assembled on a bank, and then fixed onto a revetment at a drainage outlet of a river in Suzhou New District using rivets. A number and a length of installations of the targeted in-situ ecological remediation apparatus are determined based on a volume and pollution load of wastewater entering the river. During installation of the targeted in-situ ecological remediation apparatus, the upper rectangular framework is positioned level with a water surface. The frames are arranged in a dotted pattern, that is to say, there is a certain distance between adjacent frames. One descending ball and five floating balls are serially connected from bottom to top. Then, 60 chains of these balls are placed into the accommodation cavity formed by each frame, arranged in a 10-column and 6-row pattern. Subsequently, a float plate is fixed on the upper rectangular framework of each frame. After that, emergent plants that had been pre-cultivated are planted in custom pots and then placed into the planting holes. Comparison of water quality at the drainage outlet after different durations of remediation is shown in Table 1.

TABLE 1

Comparison of water quality at a drainage outlet of a river after different durations of remediation

| Water quality index | Ammonia nitrogen (mg/L) | Total phosphorus (mg/L) | Dissolved oxygen (mg/L) | Chemical Oxygen Demand (COD) (mg/L) | Transparency (cm) |
|---|---|---|---|---|---|
| Before remediation | 7.5 | 1.2 | 2.4 | 91 | 5 |
| After 10 days of remediation | 3.5 | 1.0 | 3.2 | 48 | 25 |
| After 30 days of remediation | 1.82 | 0.35 | 3.5 | 36 | 30 |
| After 3 months of remediation | 1.57 | 0.26 | 3.7 | 25 | 45 |
| After 1 year of remediation | 1.23 | 0.23 | 4.2 | 20 | 60 |

Embodiment 3

In the embodiment 3, the frame of the targeted in-situ ecological remediation apparatus of the embodiment 1 is assembled on a bank, and then fixed onto a revetment at a drainage outlet of a river in Kunshan using rivets. A number and a length of installations of the targeted in-situ ecological remediation apparatus are determined based on a volume and pollution load of wastewater entering the river. During installation of the targeted in-situ ecological remediation apparatus, the upper rectangular framework is positioned level with a water surface. The frames are arranged in a dotted pattern, that is to say, there is a certain distance between adjacent frames. One descending ball and five floating balls are serially connected from bottom to top. Then, 60 chains of these balls are placed into the accommodation cavity formed by each frame, arranged in a 10-column and 6-row pattern. Subsequently, a float plate is fixed on the upper rectangular framework of each frame. After that, emergent plants that had been pre-cultivated are planted in custom pots and then placed into the planting holes. Comparison of water quality at the drainage outlet after different durations of remediation is shown in Table 2.

TABLE 2

Comparison of water quality at a drainage outlet of a river after different durations of remediation

| Water quality index | Ammonia nitrogen (mg/L) | Total phosphorus (mg/L) | Dissolved oxygen (mg/L) | Chemical Oxygen Demand (COD) (mg/L) | Transparency (cm) |
|---|---|---|---|---|---|
| Before remediation | 9.5 | 1.3 | 2.4 | 85 | 5 |

TABLE 2-continued

Comparison of water quality at a drainage outlet of a river after different durations of remediation

| Water quality index | Ammonia nitrogen (mg/L) | Total phosphorus (mg/L) | Dissolved oxygen (mg/L) | Chemical Oxygen Demand (COD) (mg/L) | Transparency (cm) |
|---|---|---|---|---|---|
| After 10 days of remediation | 3.8 | 1.2 | 3.1 | 47 | 20 |
| After 30 days of remediation | 1.75 | 0.38 | 3.6 | 35 | 35 |
| After 3 months of remediation | 1.37 | 0.31 | 3.7 | 23 | 40 |
| After 1 year of remediation | 1.03 | 0.21 | 4.1 | 15 | 60 |

Embodiment 4

Figure 4:
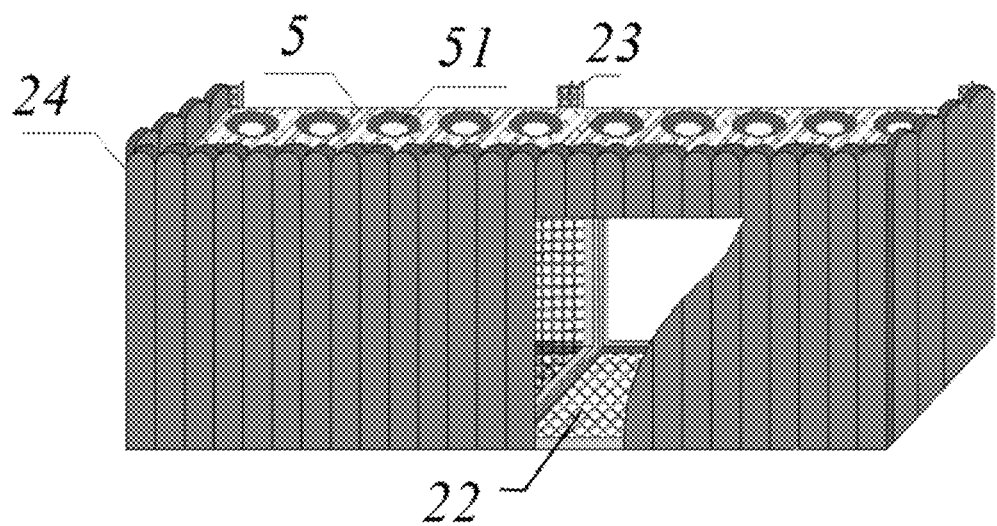
FIG. 4 illustrates a schematic structural diagram of a linearly arranged targeted in-situ ecological remediation apparatus according to an embodiment 4 of the present disclosure.

In the embodiment 4, the frame of the targeted in-situ ecological remediation apparatus of the embodiment 1 is assembled on a bank, and then fixed onto a revetment at a drainage outlet of a river in Kunshan using rivets. After calculating a volume of sewage entering the river and a pollution load, a 12-meter-long linear three-dimensional sewage interception and in-situ targeted remediation apparatus is installed along the revetment. During installation of the targeted in-situ ecological remediation apparatus, the upper rectangular framework is positioned level with a water surface. The frames are arranged in a linear pattern, that is to say, adjacent frames are welded together, as shown in FIG. 4. To achieve precise sewage interception and treatment, a number of frames to be connected in series can be calculated based on an actual volume of sewage and pollution load to be treated. A dimension of the frames can also be adjusted, providing a certain degree of flexibility. For example, the frames can be connected in series in groups of two, three, or even more, forming a linear sewage interception and treatment landscape belt that closely follows and runs parallel to the revetment. This design serves as an aesthetically pleasing ecological feature. One descending ball and five floating balls are serially connected from bottom to top. Then, 60 chains of these balls are placed into the accommodation cavity formed by each frame, arranged in a 10-column and 6-row pattern. Subsequently, a float plate is fixed on the upper rectangular framework of each frame. After that, emergent plants that had been pre-cultivated are planted in custom pots and then placed into the planting holes. Comparison of water quality at the drainage outlet after different durations of remediation is shown in Table 3.

TABLE 3

Comparison of water quality at a drainage outlet of a river after different durations of remediation

| Water quality index | Ammonia nitrogen (mg/L) | Total phosphorus (mg/L) | Dissolved oxygen (mg/L) | Chemical Oxygen Demand (COD) (mg/L) | Transparency (cm) |
|---|---|---|---|---|---|
| Before remediation | 5.2 | 0.83 | 2.6 | 53 | 10 |

TABLE 3-continued

Comparison of water quality at a drainage outlet of a river after different durations of remediation

| Water quality index | Ammonia nitrogen (mg/L) | Total phosphorus (mg/L) | Dissolved oxygen (mg/L) | Chemical Oxygen Demand (COD) (mg/L) | Transparency (cm) |
|---|---|---|---|---|---|
| After 10 days of remediation | 1.82 | 0.72 | 3.3 | 32 | 15 |
| After 30 days of remediation | 1.21 | 0.62 | 3.4 | 20 | 25 |
| After 3 months of remediation | 0.83 | 0.35 | 3.7 | 15 | 45 |
| After 1 year of remediation | 0.62 | 0.19 | 4.1 | 10 | 70 |

Embodiment 5

In the embodiment 5, natural sodium silicoaluminate is crushed, and sodium silicoaluminate particles with a mesh size of 80 to 100 mesh are screened out. A specific surface area of these sodium silicoaluminate particles with the mesh size of 80 mesh to 100 mesh is 15.63 $m^2/g$. The sodium silicoaluminate particles are soaked in sodium nitrate solution with a concentration of 4 mol/L for 24 hours, using 40 mL of the sodium nitrate solution per 1 g of the sodium silicoaluminate particles. After soaking, solid-liquid separation is performed through vacuum filtration, followed by drying at 105° C. The dried sodium silicoaluminate particles are then placed in a muffle furnace, and the muffle furnace is heated at a rate of 10 K/min to 400° C. After maintaining this temperature of 400° C. for 1 hour, the particles are removed and cooled to room temperature in a desiccator, to thereby obtain sodium nitrate calcination-modified sodium silicoaluminate particles.

Next, the sodium nitrate calcination-modified sodium silicoaluminate particles are soaked in chitosan solution with a mass concentration of 5% at a temperature of 50° C. for 1 hour. A pH value of the chitosan solution is in a range of 9.5 to 10.5. After soaking, solid-liquid separation is performed through vacuum filtration, followed by washing with water, and drying at 100° C. to thereby obtain the modified silicoaluminate inorganic mesoporous material. Tests showed that the specific surface area of the modified silicoaluminate inorganic mesoporous material is 35 $m^2/g$.

Figure 7:
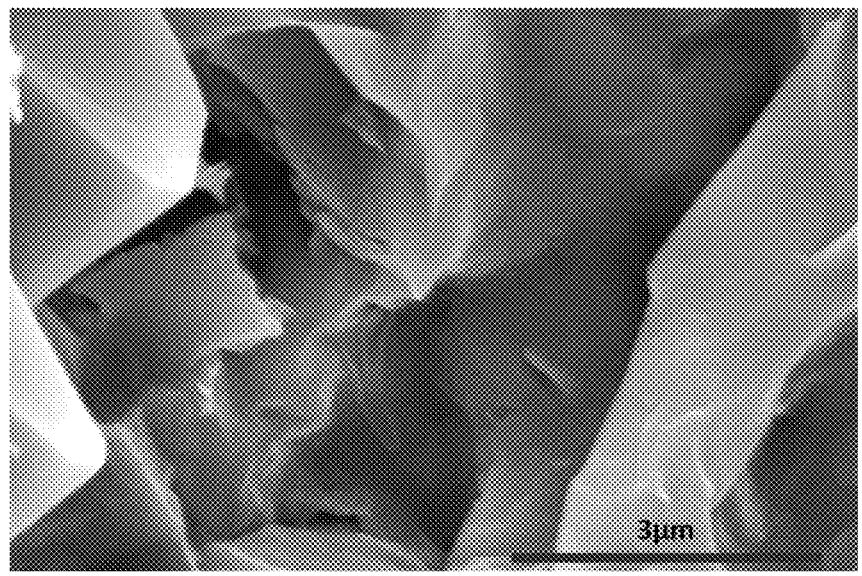
FIG. 7 illustrates a scanning electron microscope image of an internal pore structure of a modified silicoaluminate inorganic mesoporous material according to an embodiment 5 of the present disclosure.
Figure 8:
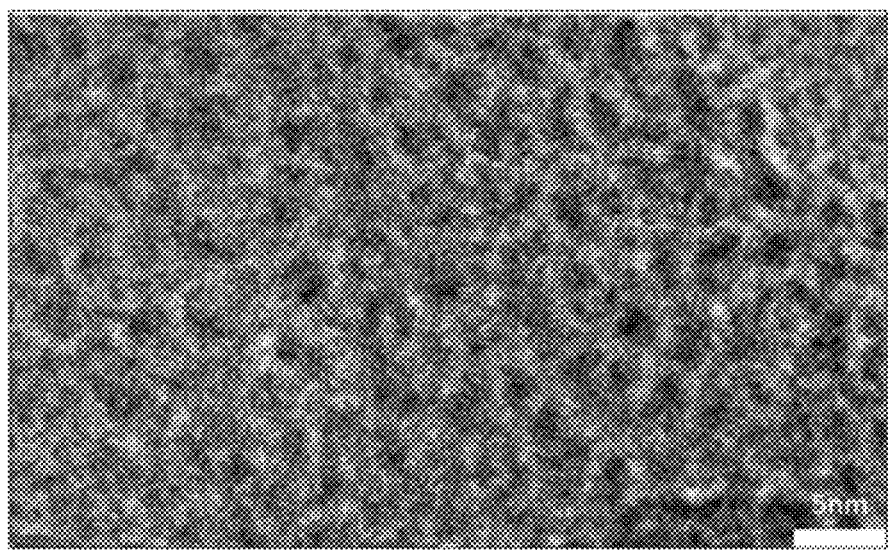
FIG. 8 illustrates a transmission electron microscope image of the internal pore structure of the modified silicoaluminate inorganic mesoporous material according to the embodiment 5 of the present disclosure.

Scanning electron microscopy (SEM) and transmission electron microscopy (TEM) are used to analyze an internal pore structure of the prepared modified silicoaluminate inorganic mesoporous material. An SEM image of the internal pore structure of the modified silicoaluminate inorganic mesoporous material is shown in FIG. 7. As shown in FIG. 7, internal pores of the modified silicoaluminate inorganic mesoporous material are approximately 3 μm in diameter. Further, a TEM image of the internal pore structure is shown in FIG. 8. As shown in FIG. 8, internal pores of the modified silicoaluminate inorganic mesoporous material are about 5 nm in diameter. From FIG. 7 and FIG. 8, it can be observed that the internal pore diameters of the modified silicoaluminate inorganic mesoporous material obtained in this embodiment range from a mesoporous level to even sub-nanometer level.

Embodiment 6

The embodiment 6 differs from the embodiment 5 in that the concentration of the sodium nitrate solution used in the embodiment 6 is 1 mol/L.

Embodiment 7

The embodiment 7 differs from the embodiment 5 in that the concentration of the sodium nitrate solution used in the embodiment 7 is 2 mol/L.

Embodiment 8

The embodiment 8 differs from the embodiment 5 in that the concentration of the sodium nitrate solution used in the embodiment 8 is 6 mol/L.

Embodiment 9

The embodiment 9 differs from the embodiment 5 in that a volume of the nitrate solution corresponding to each 1 g of sodium silicoaluminate particles is 10 mL.

Embodiment 10

The embodiment 10 differs from the embodiment 5 in that a volume of the nitrate solution corresponding to each 1 g of sodium silicoaluminate particles is 20 mL.

Embodiment 11

The embodiment 11 differs from the embodiment 5 in that a volume of the nitrate solution corresponding to each 1 g of sodium silicoaluminate particles is 60 mL.

Embodiment 12

The embodiment 12 differs from the embodiment 5 in that the muffle furnace is heated at a rate of 10 K/min to 500° C. and held at this temperature for 1 hour before removal.

Embodiment 13

The embodiment 13 differs from the embodiment 5 in that 80 mesh to 100 mesh sodium silicoaluminate particles are soaked in a 4 mol/L of potassium nitrate solution for 24 hours, with 40 mL of potassium nitrate solution per 1 g of sodium silicoaluminate particles.

Embodiment 14

The embodiment 14 differs from the embodiment 5 in that natural potassium silicoaluminate is used instead of natural sodium silicoaluminate.

Embodiment 15

The embodiment 15 differs from the embodiment 5 in that natural calcium silicoaluminate is used instead of natural sodium silicoaluminate.

Embodiment 16

The embodiment 16 differs from the embodiment 5 in that a combination of natural calcium silicoaluminate, natural potassium silicoaluminate, and natural sodium silicoaluminate is used instead of natural sodium silicoaluminate.

Comparative Example 1

The comparative example 1 differs from the embodiment 5 in that the concentration of the sodium nitrate solution used in the comparative example 1 is 0.5 mol/L.

Comparative Example 2

The comparative example 2 differs from the embodiment 5 in that the concentration of the sodium nitrate solution used in the comparative example 2 is 10 mol/L.

Comparative Example 3

The comparative example 3 differs from the embodiment 5 in that a volume of the nitrate solution corresponding to each 1 g of sodium silicoaluminate particles is 5 mL.

Comparative Example 4

The comparative example 4 differs from the embodiment 5 in that a volume of the nitrate solution corresponding to each 1 g of sodium silicoaluminate particles is 100 mL.

Comparative Example 5

The comparative example 5 differs from the embodiment 5 in that the muffle furnace is heated at a rate of 10 K/min to 300° C. and held at this temperature for 1 hour before removal.

Comparative Example 6

The comparative example 6 differs from the embodiment 5 in that the muffle furnace is heated at a rate of 10 K/min to 600° C. and held at this temperature for 1 hour before removal.

The effectiveness of treating wastewater with different initial concentrations using the modified silicoaluminate inorganic mesoporous material prepared in the embodiment 5 is shown in Table 4.

TABLE 4

Ammonia nitrogen concentrations, total phosphorus concentrations and removal rates before and after reaction for different initial sewage concentrations

| Serial Number | Ammonia nitrogen concentration before reaction (mg/L) | Total phosphorus concentration before reaction (mg/L) | Material dosage (g/L) | Ammonia nitrogen concentration after reaction (mg/L) | Ammonia nitrogen removal rate (%) | Total phosphorus concentration after reaction (mg/L) | Total phosphorus removal rate (%) |
|---|---|---|---|---|---|---|---|
| 1 | 25 | 0.87 | 35 | 1.4 | 94.4 | 0.04 | 95.4 |
| 2 | 50 | 1.35 | 60 | 2.0 | 96 | 0.12 | 91.1 |
| 3 | 100 | 1.63 | 80 | 5.0 | 95 | 0.14 | 91.4 |

TABLE 4-continued

Ammonia nitrogen concentrations, total phosphorus concentrations and removal
rates before and after reaction for different initial sewage concentrations

| Serial Number | Ammonia nitrogen concentration before reaction (mg/L) | Total phosphorus concentration before reaction (mg/L) | Material dosage (g/L) | Ammonia nitrogen concentration after reaction (mg/L) | Ammonia nitrogen removal rate (%) | Total phosphorus concentration after reaction (mg/L) | Total phosphorus removal rate (%) |
|---|---|---|---|---|---|---|---|
| 4 | 150 | 1.9 | 100 | 9.6 | 93.6 | 0.17 | 91.1 |
| 5 | 2 | 0.7 | 35 | 0.12 | 94 | 0.06 | 91.4 |

As shown in Table 4, the technical solution provided by the present disclosure achieves an ammonia nitrogen removal rate of over 90% for wastewater with ammonia nitrogen concentrations ranging from 2 mg/L to 150 mg/L, and a total phosphorus removal rate of over 90% for wastewater with total phosphorus concentrations ranging from 0.5 mg/L to 2 mg/L.

The modified silicoaluminate inorganic mesoporous materials prepared in the embodiment 5 through the embodiment 8 and the comparative examples 1 to 2 are respectively used to treat wastewater of the same concentration for denitrification and phosphorus removal. Before treatment, an initial ammonia nitrogen concentration in the wastewater is 10 mg/L, and an initial total phosphorus concentration is 1.5 mg/L. A dosage of the modified silicoaluminate inorganic mesoporous material is 35 g/L, and a reaction time is 1 day. The results are shown in Table 5.

TABLE 5

Ammonia nitrogen concentrations, total phosphorus concentrations and
removal rates after reaction for different sodium nitrate concentrations

| | Sodium nitrate concentration (mol/L) | Ammonia nitrogen concentration after reaction (mg/L) | Ammonia nitrogen removal rate (%) | Total phosphorus concentration after reaction (mg/L) | Total phosphorus removal rate (%) |
|---|---|---|---|---|---|
| Comparative example 1 | 0.5 | 1.31 | 86.9 | 0.19 | 87.3 |
| Embodiment 6 | 1 | 1.22 | 87.8 | 0.18 | 88.0 |
| Embodiment 7 | 2 | 0.89 | 91.1 | 0.12 | 92.0 |
| Embodiment 5 | 4 | 0.82 | 91.8 | 0.09 | 94.0 |
| Embodiment 8 | 6 | 0.79 | 92.1 | 0.08 | 94.7 |
| Comparative example 2 | 10 | 1.09 | 89.1 | 0.21 | 86.0 |

As shown in Table 5, in the technical solution provided by the present disclosure, when the concentration of the sodium nitrate solution is lower, an ion exchange capacity decreases, and high-temperature calcination of $NO^{3-}$ can only marginally improve a pore structure of silicoaluminate. When the concentration of the sodium nitrate solution is higher, too much nitrate enters an interior of aluminosilicate, which can easily cause pore collapse after calcination. As a preferred option, the concentration of the sodium nitrate solution should be between 1 mol/L and 6 mol/L.

The modified silicoaluminate inorganic mesoporous materials prepared in the embodiments 5, 9 to 11, and the comparative examples 3 to 4 are respectively used to treat wastewater of the same concentration for denitrification and phosphorus removal. Before treatment, an initial ammonia nitrogen concentration in the wastewater is 20 mg/L, and an initial total phosphorus concentration is 1.0 mg/L. A dosage of the modified silicoaluminate inorganic mesoporous material is 40 g/L, and a reaction time is 2 days. The results are shown in Table 6.

TABLE 6

Ammonia nitrogen concentrations, total phosphorus concentrations and removal rates
after reaction under different solid-liquid ratios of silicoaluminate to sodium nitrate

|  | Solid-liquid ratio of silicoaluminate to sodium nitrate (g:mL) | Ammonia nitrogen concentration after reaction (mg/L) | Ammonia nitrogen removal rate (%) | Total phosphorus concentration after reaction (mg/L) | Total phosphorus removal rate (%) |
|---|---|---|---|---|---|
| Comparative example 3 | 1:5 | 2.25 | 88.8 | 0.25 | 75.0 |
| Embodiment 9 | 1:10 | 1.62 | 91.9 | 0.13 | 87.0 |
| Embodiment 10 | 1:20 | 1.51 | 2.5 | 0.11 | 89.0 |
| Embodiment 5 | 1:40 | 1.32 | 93.4 | 0.10 | 90.0 |
| Embodiment 11 | 1:60 | 1.28 | 93.6 | 0.08 | 92.0 |
| Comparative example 4 | 1:100 | 1.29 | 93.6 | 0.09 | 91.0 |

As shown in Table 6, in the technical solution provided by the present disclosure, when the volume of the sodium nitrate solution is smaller, it limits cation exchange and nitrate adhesion. When the volume of the sodium nitrate solution is larger, there is minimal additional impact on improving the pollutant adsorption rate of the modified silicoaluminate. As a preferred option, the volume of nitrate solution corresponding to each 1 g of silicoaluminate particles should be between 10 mL and 60 mL.

The modified silicoaluminate inorganic mesoporous materials prepared in the embodiments 5 and 12, and the comparative examples 5 to 6 are respectively used to treat wastewater of the same concentration for denitrification and phosphorus removal. Before treatment, an initial ammonia nitrogen concentration in the wastewater is 20 mg/L, and an initial total phosphorus concentration is 1.0 mg/L. A dosage of the modified silicoaluminate inorganic mesoporous material is 35 g/L, and A reaction time is 2 days. The results are shown in Table 7.

TABLE 7

Ammonia nitrogen concentrations, total phosphorus concentrations and removal
rates after reaction under different calcination temperatures

|  | Calcination temperature (° C.) | Ammonia nitrogen concentration after reaction (mg/L) | Ammonia nitrogen removal rate (%) | Total phosphorus concentration after reaction (mg/L) | Total phosphorus removal rate (%) |
|---|---|---|---|---|---|
| Comparative example 5 | 300 | 3.63 | 81.85 | 0.37 | 63 |
| Embodiment 5 | 400 | 1.62 | 91.9 | 0.11 | 89 |
| Embodiment 12 | 500 | 1.45 | 92.75 | 0.09 | 91 |
| Comparative example 6 | 600 | 1.96 | 90.2 | 0.12 | 88 |

As shown in Table 7, in the technical solution provided by the present disclosure, if the calcination temperature is lower (below 400° C.), it does not significantly expand the pores. If the calcination temperature is higher (above 500° C.), it can easily cause the silicoaluminate framework to collapse. As a preferred option, the calcination temperature should be between 400° C. and 500° C.

Although this specification describes the embodiments in detail, it should be noted that each embodiment does not necessarily contain only one independent technical solution. This manner of description is merely for clarity. Technicians in the field should consider the specification as a whole, and the technical solutions from different embodiments can also be appropriately combined to form other implementations that can be understood by technicians in the field.

The series of detailed descriptions listed above are specific explanations of feasible embodiments of the present disclosure. They are not intended to limit the scope of protection of the present disclosure. Any equivalent implementations or changes made without departing from the spirit and scope of the application's technology should fall within the scope of protection of the present disclosure.

What is claimed is:

1. A targeted in-situ ecological remediation apparatus, comprising an ecological adsorption device, a frame, a float plate, and a planting assembly;
   wherein the ecological adsorption device is configured to be arranged in a to-be-treated river and comprises multiple ecological adsorption ball assemblies, and the multiple ecological adsorption ball assemblies are prepared from a modified silicoaluminate inorganic mesoporous material and are configured to adsorb pollutants within the to-be-treated river;
   wherein the modified silicoaluminate inorganic mesoporous material is prepared through the following steps:
      S1, crushing silicoaluminate and screening out silicoaluminate particles of 80 mesh to 100 mesh;
      S2, soaking the silicoaluminate particles obtained in the S1 in nitrate solution with a concentration of 1 mol/L to 6 mol/L for 12 hours to 24 hours to make every 1 gram (g) of the silicoaluminate particles correspond to 10 mL to 60 mL of the nitrate solution, then filtering, drying at a temperature of 95° C. to 110° C.

after the filtering, followed by calcining at a temperature of 400° C. to 500° C. for 1 hour to 2 hours to thereby obtain primary modified silicoaluminate particles; and S3, soaking the primary modified silicoaluminate particles obtained in the S2 in chitosan solution with a mass concentration of 3% to 5% and a temperature of 40° C. to 60° C. for 0.5 hours to 3 hours, then filtering and washing with water, followed by drying at a temperature of 95° C. to 110° C. to thereby obtain the modified silicoaluminate inorganic mesoporous material;

wherein the frame defines an accommodation cavity; the frame comprises a support assembly, a side plate assembly, and a bottom plate; the accommodation cavity is configured to accommodate the ecological adsorption device; and the bottom plate is a 100-mesh stainless steel screen;

wherein the float plate is disposed on the ecological adsorption device and is arranged in accommodation cavity, and multiple planting holes is arranged on the float plate;

wherein the planting assembly comprises custom pots and aquatic plants placed within the custom pots, the custom pots are disposed in the multiple planting holes, and a bottom of each of the custom pots is provided with a drainage hole;

wherein a specific surface area of the modified silicoaluminate inorganic mesoporous material is in a range of 30 40 $m^2$/g to 40 $m^2$/g;

wherein each of the multiple ecological adsorption ball assemblies comprises a descending ball and multiple floating balls, and the descending ball and the multiple floating balls are sequentially and vertically connected in that order from a bottom of the accommodation cavity to a top of the accommodation cavity;

wherein each of the multiple floating balls comprises a spherical shell; the spherical shell of each of the multiple floating balls comprises an outer shell and an inner shell adjacent to the outer shell; the outer shell of the spherical shell of each of the multiple floating balls is in a grid pattern with a mesh size of 1 cm×2 cm; the inner shell of the spherical shell of each of the multiple floating balls is made of a nylon bag with a mesh size of 80 mesh; the spherical shell of each of the multiple floating balls defines a hollow spherical cavity; a layer of the modified silicoaluminate inorganic mesoporous material and a pearl cotton layer are sequentially filled in the hollow spherical cavity of the spherical shell of each of the multiple floating balls from a bottom of the hollow spherical cavity of the spherical shell of each of the multiple floating balls to a top of the hollow spherical cavity of the spherical shell of each of the multiple floating balls; multiple slow-release nitrifying bacteria solid balls are filled in the pearl cotton layer; and the layer of the modified silicoaluminate inorganic mesoporous material in the hollow spherical cavity of the spherical shell of each of the multiple floating balls consists of a layer of modified silicoaluminate mesoporous material with a particle size of 2 cm to 4 cm, a layer of modified silicoaluminate mesoporous material with a particle size of 1 cm to 2 cm, and a layer of modified silicoaluminate mesoporous material with a particle size of 1 mm to 4 mm from the bottom of the hollow spherical cavity of the spherical shell of each of the multiple floating balls to the top of the hollow spherical cavity of the spherical shell of each of the multiple floating balls;

wherein the descending ball comprises a spherical shell; the spherical shell of the descending ball comprises an outer shell and an inner shell adjacent to the outer shell; the outer shell of the spherical shell of the descending ball is in a grid pattern with a mesh size of 1 cm×2 cm; the inner shell of the spherical shell of the descending ball is made of a nylon bag with a mesh size of 80 mesh; the spherical shell of the descending ball defines a hollow spherical cavity; a layer of the modified silicoaluminate inorganic mesoporous material and multiple slow-release nitrifying bacteria solid balls are sequentially filled in the hollow spherical cavity of the spherical shell of the descending ball from a bottom of the hollow spherical cavity of the spherical shell of the descending ball to a top of the hollow spherical cavity of the spherical shell of the descending ball; and the layer of the modified silicoaluminate inorganic mesoporous material in the hollow spherical cavity of the spherical shell of the descending ball consists of a layer of modified silicoaluminate mesoporous material with a particle size of 2 cm to 4 cm, a layer of modified silicoaluminate mesoporous material with a particle size of 1 cm to 2 cm, and a layer of modified silicoaluminate mesoporous material with a particle size of 1 mm to 4 mm from the bottom of the hollow spherical cavity of the spherical shell of the descending ball to the top of the hollow spherical cavity of the spherical shell of the descending ball; and wherein the layer of modified silicoaluminate mesoporous material with the particle size of 2 cm to 4 cm, the layer of modified silicoaluminate mesoporous material with the particle size of 1 cm to 2 cm, and the layer of modified silicoaluminate mesoporous material with the particle size of 1 mm to 4 mm in each of the descending ball and the multiple floating balls are all made from the modified silicoaluminate mesoporous material with the specific surface area of 30 $m^2$/g to 40 $m^2$/g.

2. The targeted in-situ ecological remediation apparatus as claimed in claim 1, wherein a weight ratio of the layer of the modified silicoaluminate inorganic mesoporous material to the pearl cotton layer in the hollow spherical cavity of the spherical shell of each of the multiple floating balls is in a range of 50:1 to 70:1, and a weight ratio of the pearl cotton layer to the multiple slow-release nitrifying bacteria solid balls filled in the pearl cotton layer is in a range of 0.5 to 1.

3. The targeted in-situ ecological remediation apparatus as claimed in claim 2, wherein a weight of the layer of the modified silicoaluminate inorganic mesoporous material in the hollow spherical cavity of the spherical shell of each of the multiple floating balls is 1.5 kg, a weight of the pearl cotton layer is 25 g, and a total weight of the multiple slow-release nitrifying bacteria solid balls filled in the pearl cotton layer is 40 g.

4. The targeted in-situ ecological remediation apparatus as claimed in claim 1, wherein in the hollow spherical cavity of the spherical shell of the descending ball, a weight ratio of the layer of the modified silicoaluminate inorganic mesoporous material to the multiple slow-release nitrifying bacteria solid balls is in a range of 0.02 to 0.03.

5. The targeted in-situ ecological remediation apparatus as claimed in claim 1, wherein at least one side of the frame is a horizontal plane, the support assembly comprises multiple vertical support rods and multiple horizontal support rods, the vertical support rods on the horizontal plane extend upward to form mounting components, and the mounting components are configured for fixing the frame to a revetment.

6. The targeted in-situ ecological remediation apparatus as claimed in claim 1, wherein a shape of the frame is one of a cube, cuboid, or semi-cylinder.

* * * * *